(12) United States Patent
Miller et al.

(10) Patent No.: US 7,819,191 B2
(45) Date of Patent: Oct. 26, 2010

(54) METHOD OF FRACTURING A COALBED GAS RESERVOIR

(75) Inventors: Matthew Miller, Cambridge (GB); Michaela Nagl, Cambridge (GB); Kevin England, Houston, TX (US); Ernest Brown, Cambridge (GB); Raymond Tibbles, Kuala Lumpur (MY); Gary Tustin, Sawston (GB)

(73) Assignee: Schlumberger Technology Corporation, Cambridge, MA (US)

( * ) Notice: Subject to any disclaimer, the term of this patent is extended or adjusted under 35 U.S.C. 154(b) by 115 days.

(21) Appl. No.: 11/683,245

(22) Filed: Mar. 7, 2007

(65) Prior Publication Data

US 2007/0227732 A1 Oct. 4, 2007

(30) Foreign Application Priority Data

Mar. 28, 2006 (GB) .................................. 0606133.7

(51) Int. Cl.
*E21B 43/26* (2006.01)
(52) U.S. Cl. ..................... 166/281; 166/300; 166/308.1
(58) Field of Classification Search ........................ None
See application file for complete search history.

(56) References Cited

U.S. PATENT DOCUMENTS

| | | | |
|---|---|---|---|
| 4,283,089 A * | 8/1981 | Mazza et al. ................... | 299/16 |
| 5,014,788 A * | 5/1991 | Puri et al. ................. | 166/308.1 |
| 5,229,017 A | 7/1993 | Nimerick et al. | |
| 5,417,286 A | 5/1995 | Palmer et al. | |
| 5,474,129 A | 12/1995 | Weng et al. | |
| 6,412,559 B1 * | 7/2002 | Gunter et al. ................ | 166/271 |
| 6,725,930 B2 | 4/2004 | Boney et al. | |
| 2005/0082058 A1 | 4/2005 | Bustin et al. | |
| 2006/0032632 A1 | 2/2006 | Bell | |
| 2006/0065398 A1 * | 3/2006 | Brannon et al. .......... | 166/280.2 |
| 2007/0235190 A1 | 10/2007 | Lord et al. | |

FOREIGN PATENT DOCUMENTS

| | | |
|---|---|---|
| SU | 1491080 A1 | 4/2000 |
| WO | 2006010912 A1 | 2/2006 |

OTHER PUBLICATIONS

Alain et al, Cavity stress relief method to stimulate demethanation boreholes, Unconventional Gas Recovery Symposium, Pittsburgh, PA, May 13-15, 1984, SPE/DOE/GRI 12843.

Campbell et al, Liquid $CO_2$ and sand stimulations in the Lewis Shale, San Juan Basin, New Mexico: a case study, Rocky Mountain Regional/Low Permeability Reservoirs Symposium and Exhibition, Denver, Colorado, Mar. 12-15, 2000, SPE 60317.

(Continued)

*Primary Examiner*—Zakiya W. Bates
(74) *Attorney, Agent, or Firm*—James McAleenan; Vincent Loccisano; Brigid Laffey

(57) ABSTRACT

A method for stimulation of gas production from coal seams is described using a permeability modifier, such as a coal swelling agent, injected into the coal seams via a wellbore to reduce the permeability of the coal seams prior to a fracturing treatment.

37 Claims, 5 Drawing Sheets

OTHER PUBLICATIONS

Chaback et al, Sorption irreversibilities and mixture compositional behavior during enhanced coal bed methane recovery processes, Gas Technology Conference, Calgary, Alberta, Apr. 28 to May 1, 1996, SPE 35622.

Fulton et al, A laboratory investigation of enhanced recovery of methane from coal by carbon dioxide injection, Symposium on Unconventional Gas Recovery, Pittsburgh, PA, May 18-21, 1980, SPE/DOE 8930.

Gorucu et al, Matrix shrinkage and swelling effects on economics of enhanced coalbed methane production and $CO_2$ sequestration in coal, Eastern Regional Meeting, Morgantown, WV, Sep. 14-16, 2005, SPE 97963.

Holditch, Completion methods in coal-seam reservoirs, Journal of Petroleum Technology, vol. 45, No. 3, 1993, pp. 270-276.

Khodaverdian et al, Cavity completions: a study of mechanisms and applicability, Proceedings of the 1993 International Coalbed Methane Symposium, University of Alabama/Tuscaloosa, May 17-21, 1993, pp. 89-97.

Lillies et al, Sand fracturing with liquid carbon dioxide, Production Technology Symposium, Hobbs, New Mexico, Nov. 8-9, 1982, SPE 11341.

Mazza, Liquid-free $CO_2$/sand stimulations: an overlooked technology—production update, Eastern Regional Meeting, Canton, Ohio, Oct. 17-19, 2001, SPE 72383.

Olsen et al, Improvement processes for coalbed natural gas completion and stimulation, Annual Technical Conference and Exhibition, Denver, Colorado, Oct. 5-8, 2003, SPE paper 84122.

Palmer et al, Coalbed methane well completions and stimulations, American Association of Petroleum Geologists, Studies in Geology, chapter 14, vol. 38, 1993, pp. 303-339.

Palmer et al, Openhole cavity completions in coalbed methane wells in the San Juan Basin, Journal of Petroleum Technology, vol. 45, No. 11, 1993, pp. 1072-1080.

Pekot et al, Modeling coal matrix shrinkage and differential swelling with $CO_2$ injection for enhanced coalbed methane recovery and carbon sequestration applications, US Department of Energy Topical Report, Nov. 2002, Report No. DE-FC26-00NT40924.

Yost II et al, $CO_2$/sand fracturing in Devonian shales, Eastern Regional Conference and Exhibition, Pittsburgh, PA, Nov. 2-4, 1993, SPE 26925.

Zhu et al, Analytical theory of coalbed methane recovery by gas injection, SPE Journal Dec. 2003, pp. 371-379.

* cited by examiner

METHOD OF FRACTURING A COALBED GAS RESERVOIR

The present invention relates to methods for enhancing the production of gas released from coal seams and the like. The present invention relates to methods of fracturing a coal seam gas reservoir using the injection of a fluid with a swelling agent or a mixture of swelling agents.

BACKGROUND OF THE INVENTION

Subterranean coal seams contain substantial quantities of natural gas, primarily in the form of methane. Such reservoirs are commonly referred to as coal-bed methane (CBM) reservoirs. To effectively produce gas from CBM reservoirs, one or more stimulation methods are used to increase the output.

The most common CBM stimulation methods include directionally drilling parallel to the bedding of the seam, the creation of a cavity in a coal seam, or hydraulic fracturing of the coal.

Directional drilling involves angling the drill stem so that drilling is not vertical but will parallel the coal seam. Because the bore hole trends along the formation, a greater area of the wellbore is in contact with the coal seam and thus higher gas extraction is possible.

The cavitation completion method creates on or more cavities in the coal. The purpose is to reduce the amount of damage to the surrounding structure that may have resulted during drilling, to create an enhanced permeability zone outside of the cavitated area, and to reduce the near wellbore flow resistance arising from the convergence of flow in a radially inward flow field. Typically cavity completions are performed on open-hole completed wells (no casing across the production interval) in a cyclic manner thus the treatment is usually referred to as cavitation cycling as described for example in: Palmer, I. D., Mavor, M. J., Spitler, J. L., Seidle, J. P., and Volz, R. F. 1993b. Openhole cavity completions in coalbed methane wells in the San Juan Basin. Journal of Petroleum Technology, 45(11):1072-1080 (November).

Compressed air is most frequently used to pressurize the near wellbore zone. These gases can be foamed to reduce their apparent mobility in the cleat network and contain them in the near wellbore region where they will be most effective. The pressure is bled off as fast as possible, rubblizing the near wellbore zone and producing it out of the wellbore, creating a rather large cavity surrounding the wellbore. The procedure reduces the wellbore skin effect.

Cavitation cycling uses several mechanisms to link the wellbore to the coal fracture system. These mechanisms include creating a physical cavity in the coals of the open-hole section (up to 10 feet in diameter); propagating a self-propping, vertical, tensile fracture that extends up to 200 feet away from the wellbore (parallel to the direction of maximum stress and perpendicular to the minimum principal stress); and creating a zone of shear stress-failure that enhances permeability in a direction perpendicular to the direction of least stress as described for example in: Khodaverian, M. and McLennan. 1993. Cavity completions: a study of mechanisms and applicability. Proceedings of the 1993 International Coalbed Methane Symposium (Univ. of Alabama/Tuscaloosa), pp. 89-97.

Cavitation is accomplished by applying pressure to the well using compressed air or foam, and then abruptly releasing the pressure. The over-pressured coal zones provide a pressure surge into the wellbore (a "controlled blowout"), and the resulting stress causes dislodgment of coal chips and carries the chips up the well. These cycles of pressure and blowdown are repeated many times over a period of hours or days, and the repeated alternating stress-shear failure in the coal formation creates effects that extend laterally from the wellbore as described for example in: Kahil, A. and Masszi, D. 1984. Cavity stress-relief method to stimulate demethanation boreholes. SPE Paper No. 12843, Proceedings 1984 SPE Unconventional Gas Recovery Symposium (Pittsburg).

Fracturing is another important method to enhance CBM production. As described for example in: Holditch, S. A. 1990. Completion methods in coal seam reservoirs. SPE 20670, Proceedings 65th SPE Annual Technical Conference (New Orleans), p. 533., typically hydraulic fracturing is performed on cased-hole perforated completion wells typically when the coal permeability is less than 20 mD. There are a great many variations of hydraulic fracturing coal formations, but in a rough approximation, the techniques involve injecting a fluid into the formation at sufficient pressure to initiate and propagate a hydraulic fracture, filling the fracture with proppant by continuing injection of a proppant laden fluid, and then flushing the treatment so that the proppant fills the fracture but not the wellbore. Olsen, et al., describe some additional considerations for fracturing coal-bed methane reservoirs in: Olsen, T. N., Brenize, G., and Frenzel, T.: "Improvement Processes for Coalbed Natural Gas Completion and Stimulation," SPE 84122, presented at the SPE Annual Technical Conference and Exhibition, Denver (Oct. 5-8, 2003).

Conventional hydraulic fracturing technique is described in many literature sources, as well as when applied to coal rocks. Directional drilling cannot be considered as a pure stimulation technique. It is worth to note that both fracturing (either conventional fracturing or cavitation) and directionally drilling simply increases the amount of the coal seam which is in direct contact with the well bore, and, no technological method has been found yet to increase the original porosity of the formation.

Palmer, I. D., Mavor, M. J., Spitler, J. L., Seidle, J. P., and Volz, R. F. 1993b. Openhole cavity completions in coalbed methane wells in the San Juan Basin. Journal of Petroleum Technology, 45(11):1072-1080 (November).

Holditch, S. A. 1990. Completion methods in coal seam reservoirs. SPE 20670, Proceedings 65th SPE Annual Technical Conference (New Orleans), p. 533.

Palmer, I. D., Lambert, S. W., and Spitler, J. L. 1993a Coalbed methane well completions and stimulations. Chapter 14 in AAPG Studies in Geology 38, pp. 303-341.

Olsen, T. N., Brenize, G., and Frenzel, T.: "Improvement Processes for Coalbed Natural Gas Completion and Stimulation," SPE 84122, presented at the SPE Annual Technical Conference and Exhibition, Denver (Oct. 5-8, 2003).

Khodaverian, M. and McLennan. 1993. Cavity completions: a study of mechanisms and applicability. Proceedings of the 1993 International Coalbed Methane Symposium (Univ. of Alabama/Tuscaloosa), pp. 89-97 or the above paper by Kahil, A. and Masszi, D. 1984.

Fracturing fluid leak-off through the cleat network during the fracturing process is a major limitation of modern hydraulic fracturing methods in CBM reservoirs. Fracturing fluid efficiency is the simple ratio of the volume of the created fracture at the end of pumping divided by the total volume of fluid injected to create the fracture. For obvious reasons, low fracturing fluid efficiency is undesirable. Expense and waste aside, the leaked off fluid can substantially reduce the permeability of the cleat network and defeat the benefit of the stimulation treatment. Moreover, due to various operational constraints (such as maximum injection pressure, maximum injection rate, cost, etc.) low fluid efficiency limits the fracture length that may be achieved.

Fracturing fluids injected into CBM reservoirs create a complex fracture comprised of some dominant channel and numerous minor channels. The minor channels may be part of the cleat network. High leak-off of the fracturing fluid through the cleat network reduces both the rate of growth of the main fracture and the maximum fracture length. Injecting the fracturing slurry at higher flow rates can compensate for leak-off losses, but the leaked off fluid may be trapped in the cleats, blocking the pathway through which reservoir fluids can flow from the reservoir to the wellbore. The cleat aperture can be too small for proppant to enter and prop the cleats in normal practice. Recently, fracturing fluids have been developed that are non-damaging to cleats. Whilst leaking off into the cleat network, they are free of macro-molecules that create immobile plugs in the cleats. Thus, because they are free of polymers and insoluble solids, the non-damaging filtrate is easily displaced from the cleats when the well is put on production. Olsen et al above describe such a fracturing fluid.

It is also known to use water-based fluids with dewatering aids and proppant. The presence of water in a porous medium reduces the flow capacity of that medium to other immiscible fluids such as oil or gas. In the case of CBM reservoirs, water from the injected hydraulic fracturing fluids can infiltrate the cleat network and negatively impact the surface properties (mainly wettability) of the coal. These changes can result in reduced dewatering and lead to coal fines migration, which can plug the cleats. U.S. Pat. No. 5,229,017, by Nimerick and Hinkel, describes chemicals, such as butoxylated glycols, that adsorb onto coal surfaces, rendering them hydrophobic. The hydrophobic coal surface maintains the original surface properties of the coal and hinders re-wetting and re-absorption of surfactant present in the fracturing fluid. These surfactants are delivered in the fracturing fluid and result in more rapid coal dewatering and fracturing fluid recovery out of the fracture.

Other known techniques attempt to control the leak-off into cleats. For example, U.S. Pat. No. 5,474,129 describes a process of using injected gases to perform cavity completions. Water with a foaming agent is added to the gas to create a foam downhole. The foam reduces the rate of gas leaking away from the wellbore through the cleat network. Instead, gas is trapped in the near wellbore region where it adsorbs into the near wellbore coal. Upon depressurization, the trapped gas expands and destroys the coal fabric and promotes the cavity completion process. This patent is referenced because it identifies the role of the cleats in conducting fluids away from a source. Foamed fracturing fluids are often used in CBM reservoirs to control leak-off, to reduce the hydrostatic head in the wellbore at the end of the treatment (and improve fracturing fluid recovery), and to reduce the amount of damaging polymers that enter the cleat network.

Methods of enhancing coal-bed methane production are considered enhanced recovery techniques. Enhanced recovery techniques involve flooding the CBM reservoir with gases that adsorb to coal more strongly than methane, and thus displace methane or lighter hydrocarbons from the micropore structure of the coal. Several papers describe various aspects of this technique including:

Fulton, P. F., Parente, C. A., Rogers, B. A.: "A Laboratory Investigation of Enhanced Recovery of Methane from Coal by Carbon Dioxide Injection," *SPE/DOE* 8930, presented at the 1980 SPE/DOE Symposium on Unconventional Gas Reservoirs, Pittsburg (May 18-21, 1980);

Chaback, J. J., Morgan, D., and Yee, D.: "Sorption Irreversibilities and Mixture Compositional Behavior During Enhanced Coal Bed Methane Recovery Processes," *SPE* 35622, presented at the Gas Technology Conference, Calgary (Apr. 28-May 1, 1996);

Zhu, J., Jessen, K., Kovscek, A. R., and Orr, F. M.: "Analytical Theory of Coalbed Methane Recovery by Gas Injection," SPE Journal, pp 371-379 (December 2003); or Gorucu, F. B., Jikich, S. A., Bromhal, G. S., Sams, W. N., Ertekin, T., and Smith, D. H.: "Matrix Shrinkage and Swelling Effects on Economics of Enhanced Coalbed Methane Production and $CO_2$ Sequestration in Coal," *SPE* 97963, presented at the 2005 SPE Eastern Regional Meeting, Morgantown (Sep. 14-16, 2005).

The use of liquid gas fracturing with proppant with mixtures of carbon dioxide and nitrogen or only carbon dioxide is published in general and is used for example in Canada and in the Eastern United States for shallow gas well stimulation. Liquid $CO_2$ or foams/emulsions created by mixtures of $CO_2$ and nitrogen are reported to be undamaging because the fluid will vaporize and be produced after the treatment. Descriptions of the known methods can be found for example in:

Lillies, A. T., and King, S. R.: "Sand Fracturing with Liquid Carbon Dioxide," *SPE* 11341, presented at the SPE Production Technology Symposium, Hobbs (Nov. 8-9, 1982);

Yost, A. B., Mazza, R. L., and Gehr, J. B.: "$CO_2$/Sand Fracturing in Devonian Shales," *SPE* 26925, presented at the SPE Eastern Regional Meeting, Pittsburg (Nov. 2-4, 1993);

Mazza, R. L.: "Liquid-Free $CO_2$/Sand Stimulations: An Overlooked Technology—Production Update," *SPE* 72383, presented at the SPE Eastern Regional Meeting, Canton (Oct. 17-19, 2001); and Cambell, S. M., Fairchild, N. R., and Arnold, D. L.: "Liquid $CO_2$ and Sand Stimulations in the Lewis Shale, San Juan Basin, New Mexico: A Case Study," *SPE* 60317, presented at the SPE Rocky Mountain Regional/Low-Permeability Reservoirs Symposium and Exhibition, Denver (Mar. 12-15, 2000).

Once the appropriate bore hole(s) is completed by using one of the above methods, dewatering must occur to reduce the pressure in the formation. Pressure drop in turn promotes methane release from within the coal into the cleats. If the cleats contain a high enough permeability, that is, inter-connectivity, then the methane will flow from the coal into the well bore and can be extracted.

In U.S. Pat. No. 6,412,559, there is described a process of stimulating and enhancing methane production in coal reservoirs. The process uses a stronger adsorbing gas (SAG, stronger than methane such as carbon dioxide or $H_2S$), which swells the formation during the fracturing process, the key element of their process is repeated SAG injection and shut-in steps after the stimulation treatment. The shut-in steps may be between 1 day and 1 year in length. The principle reason for the use of a SAG is to promote enhanced coal-bed methane recovery as the SAG preferentially adsorbs onto the coal and displaces adsorbed methane. The fracturing is employed at the beginning of the repeated SAG injection and shut-in steps to improve the infectivity of the SAG, i.e., the fracturing step is to reduce wellbore skin and enable improved $CO_2$ injection.

In the published US patent application 20050082058 the reaction of a predetermined gas with the coal is used to induce shrinkage within the coal matrix, thus reducing effective stress and enhancing the fracture void volume. This increased fracture void volume increases coal-bed permeability and resultant increase in methane gas flows. It also allows placement of proppant within the coals to maintain open fractures in the regions surrounding the propped fracture, thus allowing the enhanced fracture system to communicate more effectively with both the natural fracture system and the wellbore and aiding methane recovery.

In the U.S. Pat. No. 5,014,788 there is described a method to improve production by introduction of a swelling gas into the coal which after release generates uneven stress fractures. The emphasis of the known method is in the "relatively rapid reduction" in the pressure.

SUMMARY OF THE INVENTION

The objects of the invention are achieved by methods as set forth in the appended independent claims.

The invention introduces a new hydraulic fracturing method for coal seams or coal-bed methane reservoirs. The new method comprises the step of pre-treating the formation with a permeability modifier that changes the formation's physical properties, and increases the fracturing fluid efficiency. Higher fluid efficiency leads to greater fracture extension into the coal reservoir, less damage to the cleat network, and higher production rates of water (during dewatering) and of gas (during production). This invention is a new method of enhancing the effectiveness of existing hydraulic fracturing and coal-bed methane well stimulation treatments. This method can be combined with other known methods for CBM reservoir fracturing techniques or CBM stimulation as referred to above.

Specifically, at the initial stages of the hydraulic fracturing treatment, a permeability modifier is injected into the formation that swells the formation, rendering the coal seams significantly less permeable. Subsequently injected fluids will have a higher efficiency in generating fractures and will be less likely to leak-off into the coal formation. They will be capable of extending the hydraulic fracture further away from the wellbore. A longer fracture in turn will enable a larger portion of the coal seam to be produced from a single wellbore-both economically and environmentally attractive. The permeability modifier is usually injected below or at the fracture pressure of the formation. However it may also be advantageous to inject the modifier above frac pressure, or initially at below pressure to swell the near wellbore, and then later at above fracture pressure to initiate and extend a fracture.

The swelling caused by the permeability modifier is preferably temporary. A suitable component of the modifier is for example carbon dioxide. Others include carbon dioxide, nitric oxide, sulfur hexafluoride, hydrogen sulfide, sulfur dioxide, nitrogen dioxide, sulfur trioxide, trichlorofluoromethane, dichlorodifluoromethane, chlorotrifluoromethane, tetrafluoromethane, dichloromonofluoromethane, fluoroform, 1,1,2-trichloro-1,2,2-trifluoroethane, dichlorotetrafluoroethane, hexafluoroethane, chloropentafluoroethane, and combinations thereof. Another group of modifiers or swelling agents may be selected from Lewis-base donor molecules with high basicity like alkylamines, aromatic amines, primary, secondary or tertiary amines or molecules with several amine functions, lactams, amides, urea and its derivatives, more specifically for example pyridine, ammonia, methylamine, butylamine, tetramethyl ethylenediamine, 1,4-dimethylpiperazine, ethylmethylamine, N-methylpyrollidone, N-methylpyridone, urea, N,N-Dimethylformamide and similar molecules.

The injected fluid is used to swell the formation at the beginning of the stimulation treatment to improve the efficiency of the fracturing fluid. In preferred embodiments subsequent injections or longer shut-in periods are not required.

In a variant of the invention, a post-stimulation flush is contemplated using a fluid that will reverse the swelling caused by the swelling agent. It may be more advantageous to replace this post-stimulation flush by adding a suitable de-swelling agent with a delayed release mechanism to the original swelling agent to ensure that all areas contacted by swelling agent are also contacted with de-swelling agent These and other features of the invention, preferred embodiments and variants thereof, and further advantages of the invention will become appreciated and understood by those skilled in the art from the detailed description and drawing following below.

MODE(S) FOR CARRYING OUT THE INVENTION

The invention proposes a pre-fracturing treatment of a well in one or more subterranean coal seams. Prior to the fracturing a fluid is injected below or at fracturing rates and pressures. The fluid is designed to swell the coal and prevent fracturing fluid leak-off into the cleat network of the coal seam. This has the dual effect of protecting the cleats against damaging fracturing fluids, and, more importantly, improving the efficiency of the fracture propagation process so longer hydraulic fractures result.

A more complete listing of the steps of a method in accordance with an example of the invention are shown in the stages as shown in FIG. 1 and the flow chart of FIG. 2 and are listed together with possible variants and alternatives in the following.

Figure 1A:
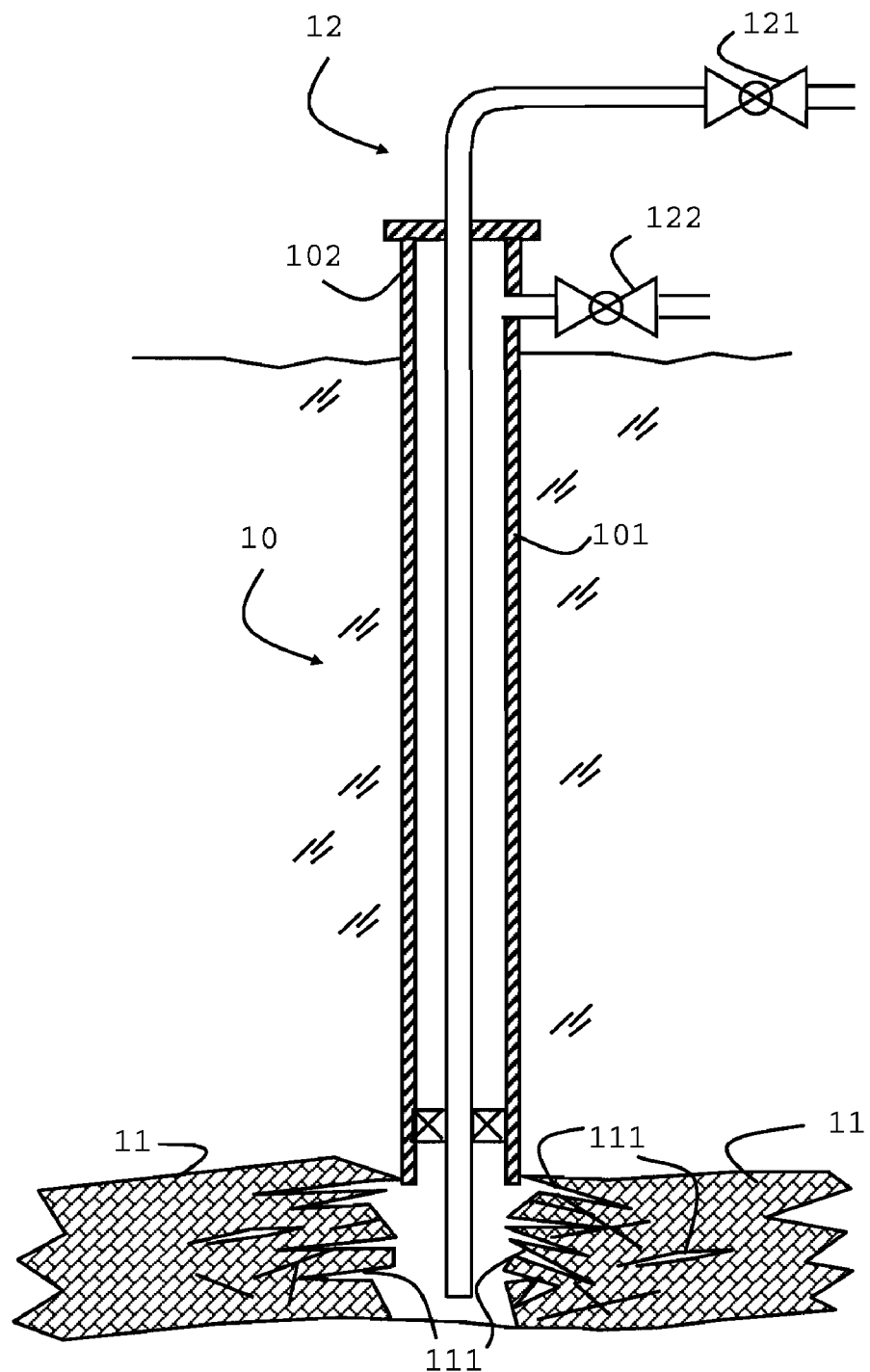
FIG. 1A-D show stages of a CBM treatment in accordance with examples of the invention.

FIG. 1A shows a well 10 drilled into a coal seam 11. The well is shown with a casing 101, but the invention equally applies to uncased or open wells. Surface flow control equipment 12 includes injection tubing 120 and valves 121 to inject fluids through the well head 102 and further tubing including valves, chokes and the like 122 to withdraw fluids from the well head 102. Further surface equipment such as containers, pumps, monitoring and controlled devices has been omitted from the drawing for the sake of increased clarity. Prior to a treatment in accordance with the invention the coal seam 11 may include a more or less developed network of fractures or cleats 111 as illustrated. It should be noted that the fractures and cleat network are drawn out of scale for the sake of clarity.

As a first step (illustrated as step 21 in the flowchart of FIG. 2) a pre-fracturing treatment is proposed by injecting a permeability modifier such as a swelling fluid, preferably at or below fracturing rates and pressures. The fluid may be either selected from the group consisting of carbon dioxide, nitric oxide, sulfur hexafluoride, hydrogen sulfide, sulfur dioxide, nitrogen dioxide, sulfur trioxide, trichlorofluoromethane, dichlorodifluoromethane, chlorotrifluoromethane, tetrafluoromethane, dichloromonofluoromethane, fluoroform, 1,1,2-trichloro-1,2,2- trifluoroethane, dichlorotetrafluoroethane, hexafluoroethane, chloropentafluoroethane, and combinations thereof, at fracture rate to create the fracture geometry (or some fraction of the frac geometry). Others formulations that swell the coal and reduce the cleat permeability such as methanol or amines as referred to below may be used.

The pre-treatment may be enhanced by adding non-damaging fluid loss additives such as platelets or fibers from polylactic acid or polyvinyl alcohol, which hydrolyze in the presence of water. Alternatively, a water based fluid with non-damaging fluid loss additives such as platelets or fibers from polylactic acid or polyvinyl alcohol may be (co-)injected.

After the pre-treatment by the permeability modifier, the well may be shut in prior to the fracturing treatment to allow for adsorption of the swelling agent. In the case of $CO_2$ this is may be a slow process. Alternatively, the main fracturing operation is initiated directly after the completion of the pre-fracturing treatment.

Figure 1B:
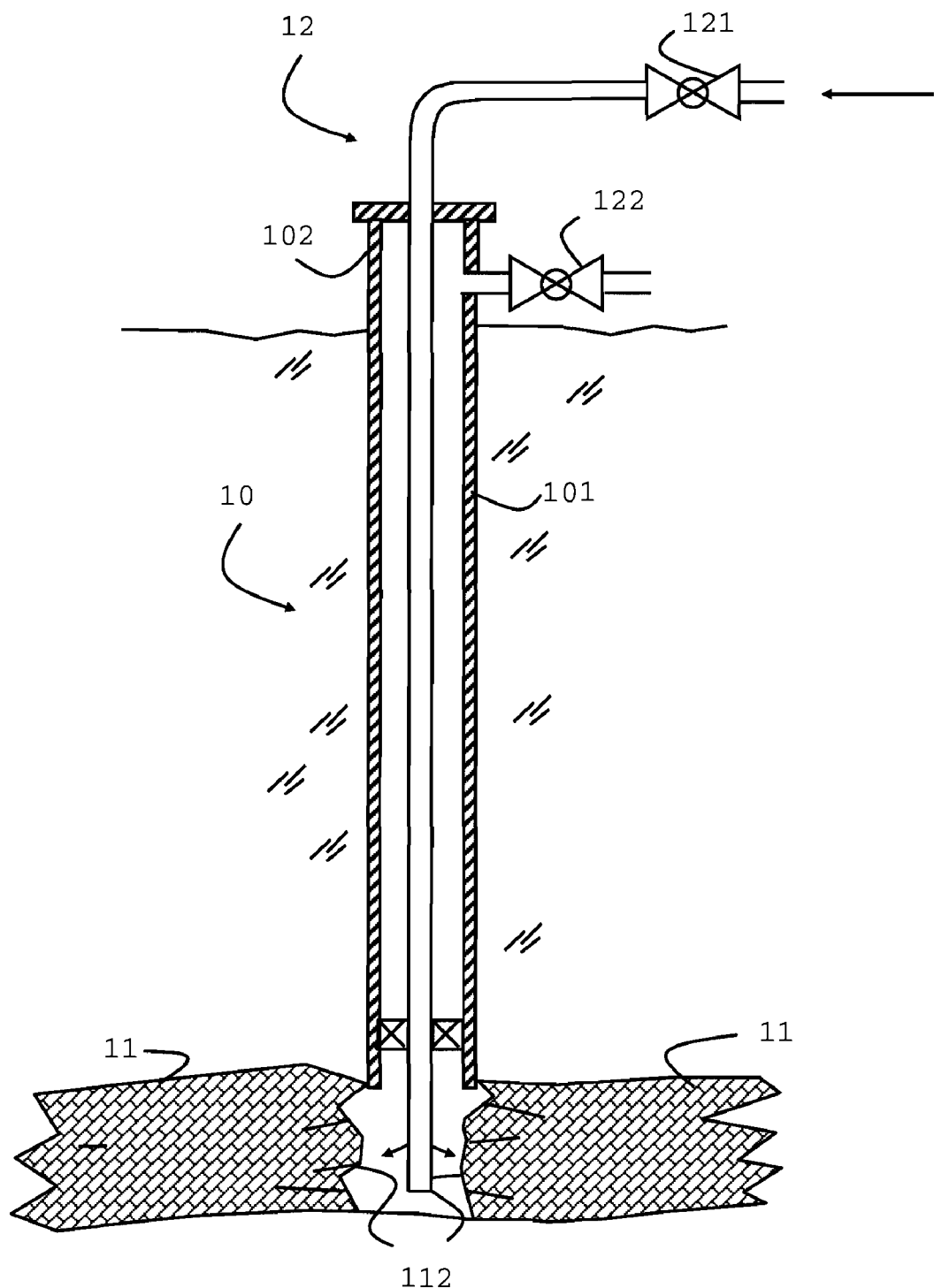

Ideally the network of fractures as shown in FIG. 1A is reduced to offer a more solid face 112 as shown in FIG. 1B to the fracturing step. As such the likelihood and amount of leak-off into the formation during fracturing is reduced.

The following fracturing operations (step 22 of FIG. 2) may include any of the five stages consisting of pre-flush, pre-pad, pad, slurry and final flush treatment.

The main fracture treatment injects a fracturing fluid at pressures above the fracturing pressure and rates according to well-known practice of fracturing operations.

Fracturing fluids are known as such and may comprise any combination of a carrier fluid, proppants, fluid loss material, breakers, stabilizers, encapsulated chemicals and other known agents for fracturing fluids. Suitable carrier fluids are water, nitrogen, $CO_2$, foamed or energized (combination of water and a gas), gelled oil, viscosified water (with synthetic or natural polymers with or without crosslinkers, or viscoelastic surfactants). Examples of some of these fluids can be found in a wide body of literature as cited above or as for example in the well-known handbook *Reservoir Stimulation*, $3^{rd}$ ed., Economides, M. J., and Nolte, K. G, (editors), John Wiley and Sons (2000). Proppants may include sand, resin coated sand, bauxite, ceramic, and resin coated bauxite or ceramic, and other granulated materials and composites such as high density plastics, ground walnut shells coated in resin, etc. Other proppant materials are solids with a high aspect ratio, similar to those cited in U.S. Pat. No. 6,725,930. Fluid loss materials are extremely wide ranged and may also include sand, polymeric materials such as guar and resins or fibrous materials.

The fracturing fluid may contain a swelling agents as in the initial stage as a further component.

The main fracturing step may be modified to better suit the requirement of coal-bed gas extraction by for example superimposing periodic pressure oscillations or shocks during the fracture treatment in order to rubblize, or spall the fracture face to prevent alignment and closing of the fracture. In this case, a pressure pulse generator can be lowered into the wellbore to approximately the zone of interest. The performance of the generator can be improved by loading the wellbore with an incompressible fluid in order to efficiently couple the formation to the pressure pulse generator and transmit pressure pulses to the formation.

In some case it may be advantageous to provide the conveyance tool for the fracturing fluid with a special bottom hole assembly (BHA) with flow dispenser thus allowing two flows to pass from the surface to the subterranean formation. One flow feeds the tool and supports pumping, and the rest is designed to flow sideways and keep the fractures open. Such a BHA is used to handle both high flow rate and pulsing during pumping. Where the flow is loaded with proppant, it may be necessary to provide the above mentioned flow dispenser with a proppant filter to protect the tool from blockage.

When the pressure oscillations are performed during the pre-pad stage or pad stage, the pressure pulse generator is operated in a manner that creates pressure pulses of desired frequency and amplitude. When oscillating the pressure during the slurry stage, the operation time may be limited by the filter loading time.

The above steps may be further modified for example by using fibers in the fluid for partial fracture diversion (dendritic fracture) or by periodically injecting bridging materials to arrest tip growth in one direction. The fracturing treatment may also be continued to create new fracture pathways.

Figure 1C:
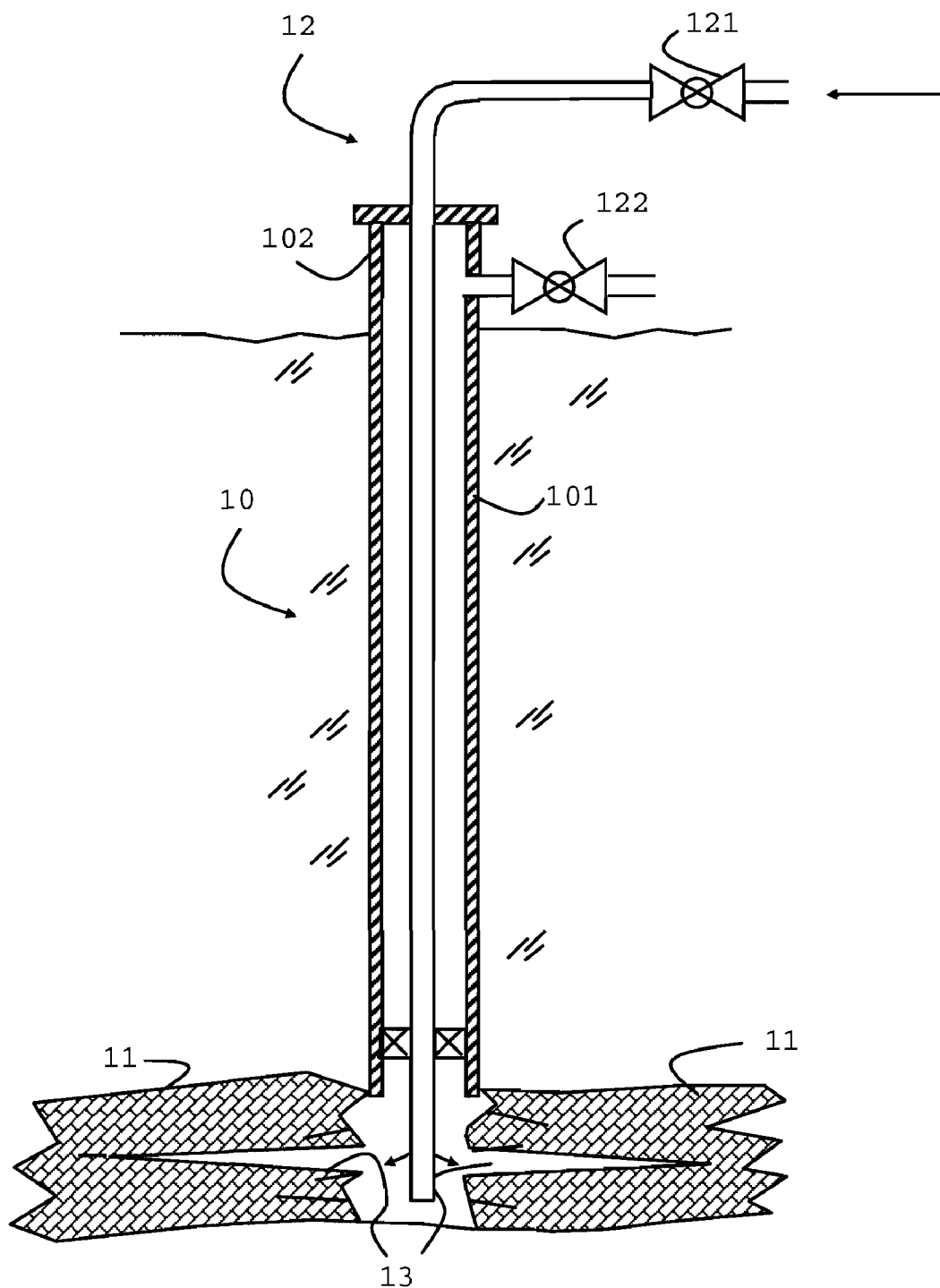

The result of the fracturing is shown in FIG. 1C. A fracture 113 has opened in the coal seam 11.

After the fracturing operation any fracturing tools can be removed and production equipment installed as required to start production (step 24 of FIG. 2) of the coal-bed reservoir.

Figure 2:
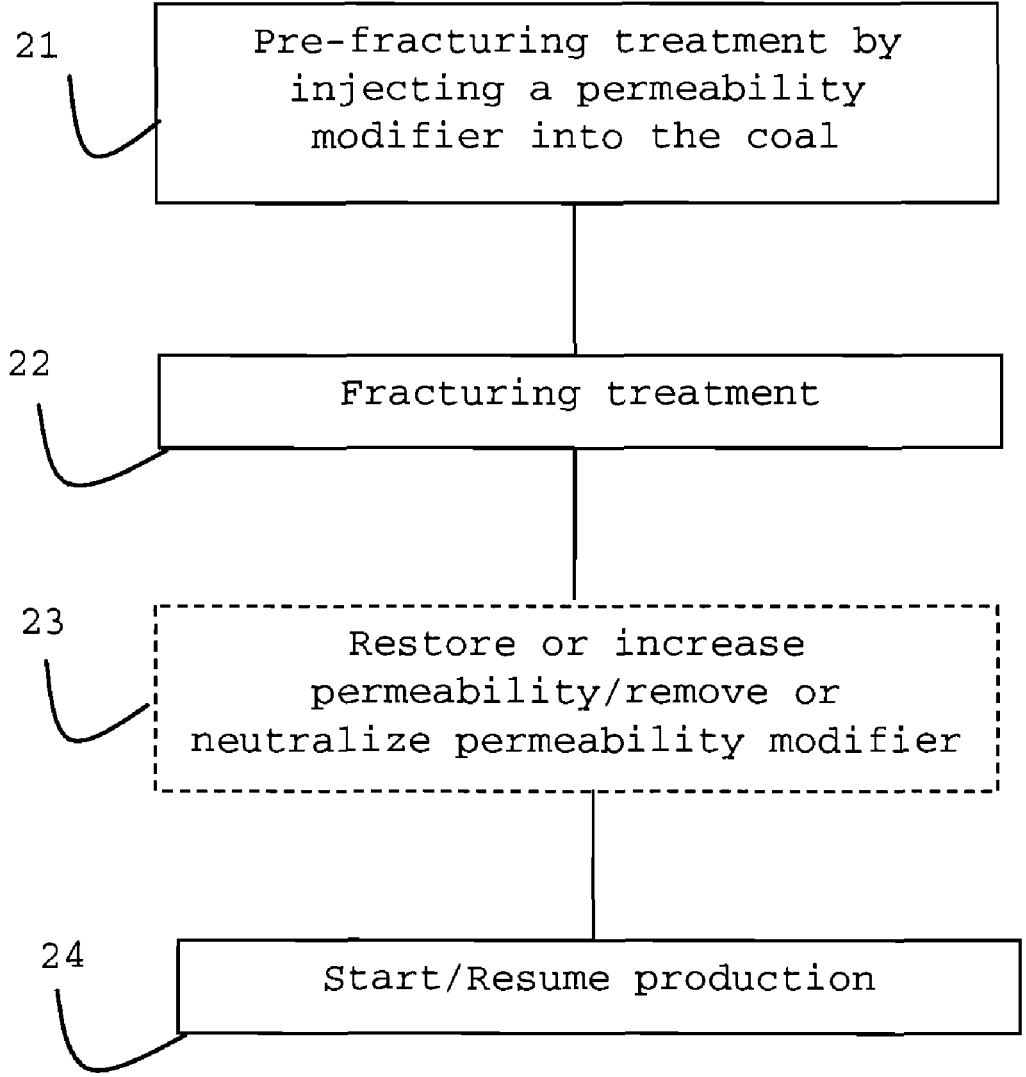
FIG. 2 shows a flow chart summarizing steps in accordance with an example of the invention.

The invention further contemplates the optional step of unswelling the formation (step 23 of FIG. 2). This can be achieved by chemical such as pH-change treatment to cause shrinkage using for example $CO_2$ desorption; by heating or cooling the formation through injection of a coolant or heated fluid; or by injection of a stronger adsorbing material that shrinks the formation and possibly releases the previously adsorbed swelling agent or any combination of the above. As an example a fluid with an acid or an acid precursor may be pumped after the treatment or, if the pH-change is delayed, con-currently with the swelling agent.

Figure 1D:
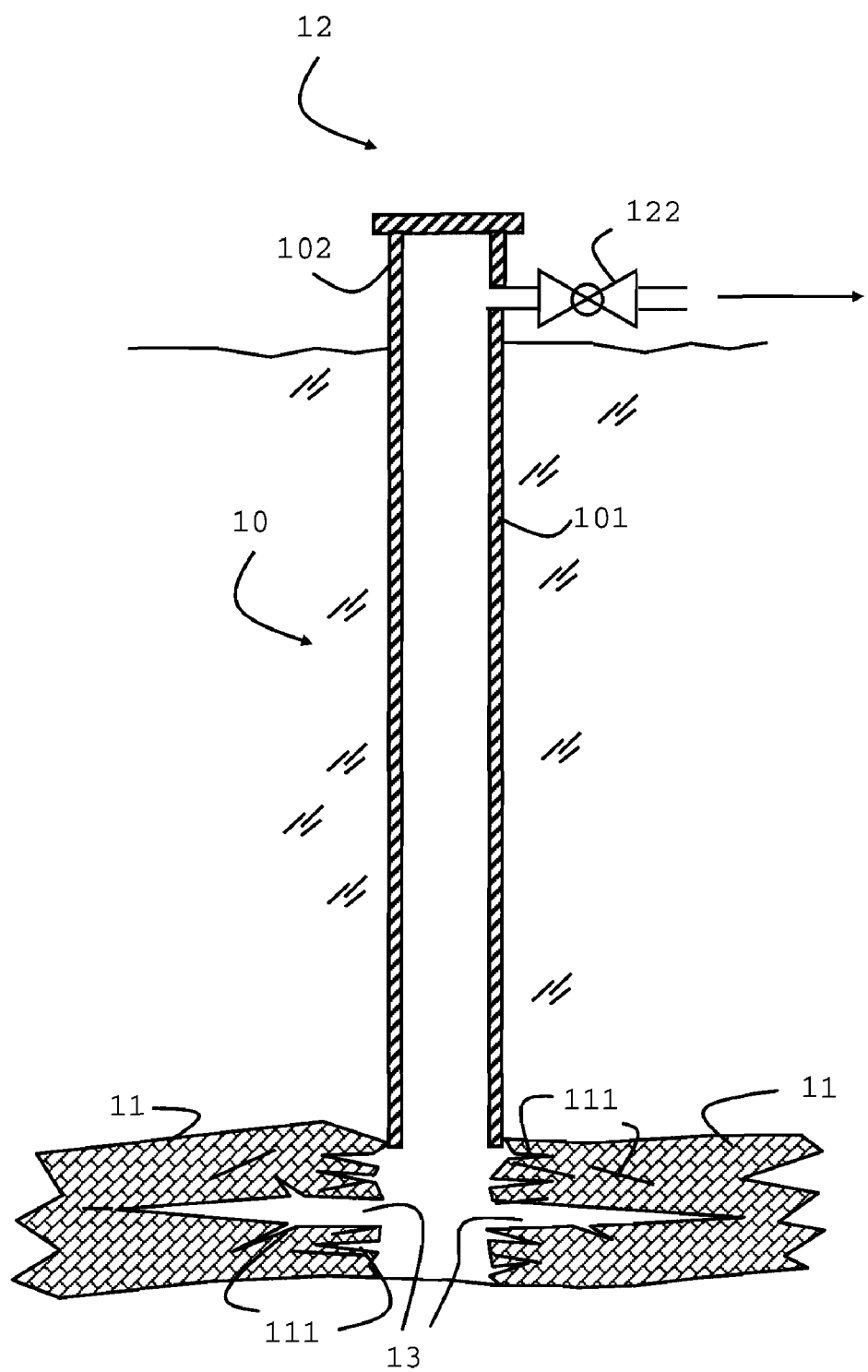

As a result more fractures and cleat 111 would open or reopen as shown in FIG. 1D to increase the permeability of the coal seam 11.

The results of the above methods can be partly derived from modeling the effects of the permeability modifier on the formation.

As shown carbon dioxide has a differing behavior to that of methane. The difference is that coal has a higher sorptive capacity for $CO_2$ than for methane. This means that more carbon dioxide can be stored in the coal matrix than methane at the same temperature and pressure conditions leading to more volumetric strain. The higher strain then leads directly to a reduced porosity, which in turn leads to a lower effective permeability. The phenomenon is referred to as differential swelling is known in the area of coal mining. For the purposes of this invention it is recognized that this behavior can be beneficial if applied at the right stage in a fracturing process.

In order to estimate the magnitude of change a basic equation for coal matrix shrinkage can be used with an added term to account for the differential swelling.

Using a model COMET available in the industry the swelling behavior can be thus modeled by:

$$\varphi = \varphi_i[1 - c_p(P - P_i)] - c_m(1 - \varphi_i)\left(\frac{\Delta P_i}{\Delta C_i}\right)[(C - C_i) + c_k(C_t - C)] \quad [1]$$

with
C=reservoir gas concentration, dimensionless
$C_i$=initial reservoir gas concentration, dimensionless
$c_m$=matrix shrinkage compressibility,
$c_p$=pore volume compressibility,
P=reservoir pore pressure,
$P_i$=initial reservoir pore pressure,
$\phi$=fracture system porosity, decimal fraction and
$\phi_i$=initial fracture system porosity, decimal fraction
$c_k$=differential swelling coefficient, dimensionless
$C_t$=total reservoir gas concentration, dimensionless This equation expresses the fundamental change in coal porosity as a result of pressure-depletion due to desorption of the methane. The differential swelling coefficient is determined through laboratory testing. The porosity/permeability relationship used to determine the change in effective permeability $k/k_i$ due to the change in pore volume, which is affected by the increased total gas concentration (carbon dioxide), is $$\frac{k}{k_i} = \left(\frac{\varphi}{\varphi_i}\right)^n \quad [2]$$

Pekot, L. J. and Reeves, S. R. have shown in: "Modeling Coal Matrix Shrinkage and Differential Swelling with CO2 Injection for Enhanced Coalbed Methane Recovery and Carbon Sequestration Applications," Topical Report, US DOE Report Number DE-FC26-00NT40924, November 2002, that the effective permeability can be reduced by 90% due to the presence of carbon dioxide with the methane at initial reservoir conditions.

As a consequence, the initial injection of carbon dioxide or another swelling agent into a new well will increase the total gas content and cause a differential swelling of the coal matrix. This results in more favorable conditions for hydraulic fracture stimulation treatments. The lower effective permeability means that the fracturing fluid leakoff can be controlled much easier resulting in a less complex and more predictable hydraulic fracturing behavior and leading to increased fracture penetration into the reservoir. The increased length will contact more reservoir area and provide for the potential to drain a larger volume of gas from a single wellbore. Lower leakoff can also be expected to significantly reduce the damage of the coal seam due to the fracturing fluid interaction with the surface properties of the coal and the water-blocking of cleats which are conduits for the diffused gas from the coal matrix to flow to the fracture and then to the wellbore.

When applying the treatment to a well which has already been in production or received a production enhancement treatment, methane has already been desorbed from coal seam and carbon dioxide has been injected as a secondary recovery method. The larger carbon dioxide molecules have a higher affinity for the surface of the coal and can displace methane at the reduced reservoir pressures. In this case the carbon dioxide will still be creating a decrease in the effective permeability of the matrix. Methane can still be effectively desorbed because the seam has been mostly dewatered. A hydraulic fracturing treatment at this time will still be more effective for the same reasons mentioned for the newly drilled wells. In this case the hydraulic fracture will increase the effective wellbore radius and lead to improved injection performance for the carbon dioxide. The hydraulic fracture exposes most likely new area for methane desorption, which will benefit from the decreased reservoir pressure and the new connection created by the hydraulic fracturing treatment. The rest of the reservoir will benefit from improved injectivity of carbon dioxide due to the hydraulic fracturing treatment.

A secondary benefit may be the improved conditions for injection of carbon dioxide for sequestration.

While the above example demonstrates its advantages, carbon dioxide may not be the most effective permeability modifier or swelling agent for creating these results and benefits.

The rate of coal swelling can be further increased by increasing the temperature as well as addition of solvents with a high basicity and chelating properties. It is known from experiments on coal that pre-treatment with an acid such as HCl followed by an amine such as ethylenediamine or pyridine increases the rate of swelling compared to non-pretreated coals. From similar experiments, it is known that tetrabutylammonium hydroxide, ethanol or tetrahydrofurane can act as efficient swelling agents. It is also feasible to use electron-rich or Lewis-base donor molecules with high basicity like alkylamines, aromatic amines, primary, secondary or tertiary amines, molecules with several amine functions, lactams, amides, urea and its derivatives. Specific examples of potential swelling agents are pyridine, ammonia, methylamine, butylamine, tetramethyl ethylenediamine, 1,4-dimethylpiperazine, ethylmethylamine, N-methylpyrollidone, N-methylpyridone, urea, or N,N-Dimethylformamide.

While environmental concern may exclude certain of the above compounds from use in an open environment, non-toxic but chemically closely related compounds are known. As in case of carbon dioxide, the swelling and adsorption efficiency of amines appears less dependent on the coal rank than on the initial moisture content in the coals.

The $CO_2$ can be either injected together with the amine into the well, which will lead to increased swelling. Another suggestion is to inject a concentrated solution of urea, which is the condensation product of ammonia and $CO_2$. At elevated temperatures and in combination with HCl urea decomposes to ammonia and $CO_2$, which could be a way to desorb the material from the coal.

While the emphasis for this invention is focused on enhanced CBM recovery, it is clear that some of the steps are of use in other hydraulic fracturing applications.

The invention claimed is:

1. A method for stimulation of gas production from a coal seam comprising the steps of:
    supplying permeability modifier which is a swelling agent for coal into the coal seam via a wellbore intersecting said subterranean coal seam and thereby reducing the permeability of the coal seam prior to a fracturing treatment;
    subsequently to reduction of permeability of the coal seam, performing a hydraulic fracturing treatment comprising injecting a fracturing fluid at pressure above fracturing pressure of the coal seam, and
    supplying an agent to reduce the effect of the permeability modifier after the hydraulic fracture.

2. The method of claim 1, wherein the permeability modifier reduces cleat permeability.

3. The method of claim 1, wherein the permeability modifier is selected from a group consisting of carbon dioxide, nitric oxide, sulfur hexafluoride, hydrogen sulfide, sulfur dioxide, nitrogen dioxide, sulfur trioxide, trichlorofluoromethane, dichlorodifluoromethane, chlorotrifluoromethane, tetrafluoromethane, dichloromonofluoromethane, fluoroform, 1,1,2-trichloro-1,2,2-trifluoroethane, dichlorotetrafluoroethane, hexafluoroethane, chloropentafluoroethane, Lewis base donor molecules with high basicity, primary, secondary or tertiary amines, alkylamines, aromatic amines, molecules with several amine functions, lactams, amides, urea and its derivatives, pyridine, ammonia, methylamine, butylamine, tetramethyl ethylenediamine, 1,4-dimethylpiperazine, ethylmethylamine, N-methylpyrollidone, N-methylpyridone, N,N-Dimethylformamide and combinations thereof.

4. The method of claim 1, wherein the permeability modifier comprises fluid loss additives.

5. The method of claim 1, further comprising the step of treating the well with periodic or non-periodic pressure pulses.

6. The method of claim 1, wherein the effectiveness of the permeability modifier reduces with time in the coal seam.

7. The method of claim 1, wherein the agent that reduces the effect of the permeability modifier comprises an acid or precursor of an acid.

8. The method of claim 1, further comprising the step of using an agent to promote further shrinkage of the coal seam after the fracturing step.

9. The method of claim 1, wherein the fracturing step include the injection of a fracturing fluid carrying proppants.

10. The method of claim 1 including the step of injecting fluids at temperatures other than the ambient temperature.

11. The method of claim 1, wherein the permeability modifier is supplied at a pressure below a fracture pressure of the coal seam.

12. The method of claim 1, wherein the step of performing the fracturing treatment comprises injecting a fracturing fluid and the permeability modifier.

13. The method of claim 1, wherein the fracturing fluid is foamed or energized.

14. The method of claim 1 wherein the fracturing fluid is nitrogen, carbon dioxide or gelled oil.

15. The method of claim 1, wherein the permeability modifier is supplied at a pressure at or above a fracture pressure of the coal seam.

16. A method of increasing the efficiency of a fracturing operation for stimulation of gas production from a coal seam, the method comprising the steps of:
supplying permeability modifier which is a swelling agent for coal into the coal seam via a wellbore intersecting said subterranean coal seam and thereby reducing the permeability of the coal seam prior to a fracturing treatment;
subsequently to reduction of permeability of the coal seam, performing a hydraulic fracturing treatment comprising injecting a fracturing fluid at pressure above fracturing presure of the coal seam, and
supplying an agent to reduce the effect of the permeability modifier after the hydraulic fracture.

17. A method of reducing leak-off of fracturing fluid in a fracturing operation for stimulation of gas production from a coal seam, the method comprising the steps of:
supplying permeability modifier which is a swelling agent for coal into the coal seam via a wellbore intersecting said subterranean coal seam and thereby reducing the permeability of the coal seam prior to a fracturing treatment;
subsequently to reduction of permeability of the coal seam, performing a hydraulic fracturing treatment comprising injecting a fracturing fluid at pressure above fracturing pressure of the coal seam, and
supplying an agent to reduce the effect of the permeability modifier after the hydraulic fracture.

18. A method for stimulation of gas production from a coal seam comprising the steps of:
supplying permeability modifier which is a swelling agent for coal into the coal seam via a wellbore intersecting said subterranean coal seam and thereby reducing the permeability of the coal seam prior to a fracturing treatment; and
subsequently to reduction of permeability of the coal seam, performing a hydraulic fracturing treatment comprising injecting a fracturing fluid at pressure above fracturing pressure of the coal seam,
wherein the effectiveness of the permeability modifier reduces with time in the coal seam.

19. The method of claim 18, wherein the permeability modifier is selected from a group consisting of carbon dioxide, nitric oxide, sulfur hexafluoride, hydrogen sulfide, sulfur dioxide, nitrogen dioxide, sulfur trioxide, trichlorofluoromethane, dichlorodifluoromethane, chlorotrifluoromethane, tetrafluoromethane, dichloromonofluoromethane, fluoroform, 1,1,2-trichloro-1,2,2-trifluoroethane, dichlorotetrafluoroethane, hexafluoroethane, chloropentafluoroethane, Lewis base donor molecules with high basicity, primary, secondary or tertiary amines, alkylamines, aromatic amines, molecules with several amine functions lactams, amides, urea and its derivatives, pyridine, ammonia, methylamine, butylamine, tetramethyl ethylenediamine, 1,4-dimethylpiperazine, ethylmethylamine, N-methylpyrollidone, N-methylpyridone, N,N-dimethylformamide and combinations thereof.

20. The method of claim 18, wherein the permeability modifier comprises fluid loss additives.

21. The method of claim 18 further comprising the step of using an agent to promote further shrinkage of the coal seam after the fracturing step.

22. The method of claim 18, wherein the permeability modifier is supplied at a pressure below a fracture pressure of the coal seam.

23. The method of claim 18, wherein the permeability modifier is supplied at a pressure at or above a fracture pressure of the coal seam.

24. A method for stimulation of gas production from a coal seam comprising the steps of:
supplying permeability modifier into the coal seam via a wellbore intersecting said subterranean coal seam and thereby reducing the permeability of the coal seam prior to a fracturing treatment; and
subsequently to reduction of permeability of the coal seam, performing a hydraulic fracturing treatment comprising injecting a fracturing fluid at pressure above fracturing pressure of the coal seam,
further comprising the step of treating the well with periodic or non-periodic pressure pulses.

25. The method of claim 24, wherein the permeability modifier is selected from a group consisting of carbon dioxide, nitric oxide, sulfur hexafluoride, hydrogen sulfide, sulfur dioxide, nitrogen dioxide, sulfur trioxide, trichlorofluoromethane, dichlorodifluoromethane, chlorotrifluoromethane, tetrafluoromethane, dichloromonofluoromethane, fluoroform, 1,1,2-trichloro-1,2,2-trifluoroethane, dichlorotetrafluoroethane, hexafluoroethane, chloropentafluoroethane, Lewis base donor molecules with high basicity, primary, secondary or tertiary amines, alkylamines, aromatic amines, molecules with several amine functions lactams, amides, urea and its derivatives, pyridine, ammonia, methylamine, butylamine, tetramethyl ethylenediamine, 1,4-dimethylpiperazine, ethylmethylamine, N-methylpyrollidone, N-methylpyridone, N,N-dimethylformamide and combinations thereof.

26. The method of claim 24, wherein the permeability modifier comprises fluid loss additives.

27. The method of claim 24 further comprising the step of using an agent to promote further shrinkage of the coal seam after the fracturing step.

28. The method of claim 24, wherein the permeability modifier is supplied at a pressure below a fracture pressure of the coal seam.

29. The method of claim 24, wherein the permeability modifier is supplied at a pressure at or above a fracture pressure of the coal seam.

30. A method for stimulation of gas production from a coal seam comprising the steps of:
supplying permeability modifier which is a swelling agent for coal into the coal seam via a wellbore intersecting said subterranean coal seam and thereby reducing the permeability of the coal seam, wherein the permeability modifier is supplied at a pressure above a fracture pressure of the coal seam; and then performing a fracturing treatment on the coal seam after the reduction of its permeability.

31. The method of claim 30, wherein the permeability modifier reduces cleat permeability.

32. The method of claim 30, wherein the permeability modifier is selected from a group consisting of carbon dioxide, nitric oxide, sulfur hexafluoride, hydrogen sulfide, sulfur dioxide, nitrogen dioxide, sulfur trioxide, trichlorofluoromethane, dichlorodifluoromethane, chlorotrifluoromethane, tetrafluoromethane, dichloromonofluoromethane, fluoroform, 1,1,2-trichloro-1,2,2-trifluoroethane, dichlorotetrafluoroethane, hexafluoroethane, chloropentafluoroethane, Lewis base donor molecules with high basicity, primary, secondary or tertiary amines, alkylamines, aromatic amines, molecules with several amine functions lactams, amides, urea and its derivatives, pyridine, ammonia, methylamine, butylamine, tetramethyl ethylenediamine, 1,4-dimethylpiperazine, ethylmethylamine, N-methylpyrollidone, N-methylpyridone, N,N-Dimethylformamide and combinations thereof.

33. The method of claim 30, wherein the permeability modifier comprises fluid loss additives.

34. The method of claim 30, further comprising the step of treating the well with periodic or non-periodic pressure pulses.

35. The method of claim 30, wherein the effectiveness of the permeability modifier reduces with time in the coal seam.

36. The method of claim 30, wherein the step of performing the fracturing treatment comprises injecting a fracturing fluid which contains permeability modifier which is a swelling agent for coal.

37. The method of claim 30, wherein the step of performing the fracturing treatment comprises injecting a fracturing fluid which contains solid proppant.

* * * * *